United States Patent
Oyama et al.

(10) Patent No.: US 7,990,935 B2
(45) Date of Patent: Aug. 2, 2011

(54) NETWORK MOBILITY SUPPORT AND ACCESS CONTROL FOR MOVABLE NETWORKS

(75) Inventors: Johnson Oyama, Mississauga (CA); Ryoji Kato, Kanagawa (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 764 days.

(21) Appl. No.: 10/598,491

(22) PCT Filed: Nov. 24, 2004

(86) PCT No.: PCT/SE2004/001735
§ 371 (c)(1), (2), (4) Date: Dec. 6, 2006

(87) PCT Pub. No.: WO2005/094037
PCT Pub. Date: Oct. 6, 2005

(65) Prior Publication Data
US 2007/0223410 A1    Sep. 27, 2007

Related U.S. Application Data

(60) Provisional application No. 60/551,040, filed on Mar. 9, 2004.

(51) Int. Cl.
*H04B 7/00* (2006.01)
(52) U.S. Cl. ............... 370/338; 370/310; 455/432.1
(58) Field of Classification Search .............. 370/338; 455/432.1
See application file for complete search history.

(56) References Cited

U.S. PATENT DOCUMENTS

| | | | |
|---|---|---|---|
| 6,829,709 B1 * | 12/2004 | Acharya et al. | 370/338 |
| 7,295,551 B1 * | 11/2007 | Leung et al. | 370/389 |
| 7,668,145 B2 * | 2/2010 | Le et al. | 370/338 |
| 7,912,477 B2 * | 3/2011 | Tamura et al. | 455/452.2 |
| 2002/0034939 A1 * | 3/2002 | Wenzel | 455/426 |
| 2002/0080752 A1 * | 6/2002 | Johansson et al. | 370/338 |
| 2004/0023653 A1 * | 2/2004 | O'Neill | 455/432.1 |

(Continued)

FOREIGN PATENT DOCUMENTS
WO    WO 03/043226 A    5/2003

OTHER PUBLICATIONS

Montavont, et al., Home Agent Filtering for Mobile IPv6 Draft-Montavont-MobileIP HA Filtering; Jul. 23, 2003.

(Continued)

*Primary Examiner* — Dwayne Bost
*Assistant Examiner* — Joseph Dean, Jr.

(57) ABSTRACT

The invention relates to access control for a movable network (15) managed by a mobile router (10), wherein said mobile route is interconnected through a bi-directional link (40) with a mobility anchoring agent (20) that anchors the network mobility for the mobile router. According to the invention, access control enforcement points (11, 21) are located at both the mobile router (10) and the mobility anchoring agent (20). Access control is exercised at the mobility agent (20) to filter downlink packets to the mobile router (10) and access control is exercised at the mobile router (10) to filter uplink packets to the mobility anchoring agent (20). In this way, unauthorized packets, both uplink and downlink, do not have to cross the air interface before being filtered away, thereby preventing waste of valuable radio resources. The access control modules are typically provisioned with access control filter information, preferably by means of a hierarchical provisioning structure.

21 Claims, 7 Drawing Sheets

U.S. PATENT DOCUMENTS

2004/0100951 A1* 5/2004 O'neill .................... 370/389
2005/0058100 A1* 3/2005 Lee et al. .................. 370/331
2007/0140181 A1* 6/2007 Channegowda et al. ...... 370/338

OTHER PUBLICATIONS

Ng CW; Tanaka T: "Usage Scenario and Requirements for AAA in Network mobility Support" Internet Draft, Oct. 2002, XP015004581 p. 3, lines 1-27 p. 6; figure 2.

Devarapalli V et al: "Network Mobility (NEMO) Basic Support Protocol" Internet Draft, Dec. 2003, XP002323704 section 3, section 5, section 6.5, section 9.

Askoan N. et al: "AAA for IPv6 Network Access" IETF Draft, Jan. 5, 2000, XP02323703 sections 1, 2, section 3.1, section 4.2.1, section 6.1 and section 10.1.

\* cited by examiner

NETWORK MOBILITY SUPPORT AND ACCESS CONTROL FOR MOVABLE NETWORKS

CROSS-REFERENCE TO RELATED APPLICATIONS

This application is a Section 371 national stage filing of International Application No. PCT/SE2004/001735, filed Nov. 24, 2004, which claims the benefit of U.S. Provisional Application No. 60/551,040, filed Mar. 9, 2004, the disclosures of which are fully incorporated herein by reference.

BACKGROUND

The present invention generally relates to network mobility support and access control, and more particularly to access control for movable networks, also commonly referred to as mobile networks.

Mobile IP is an example of how to provide basic node mobility support, allowing nodes to move within the Internet topology while maintaining reachability and on-going connections with correspondent nodes. In this context, each mobile node is generally identified by its home address, regardless of its current point of attachment to the Internet. While situated away from its home network, a mobile node is also associated with a care-of address (CoA), which provides information about the mobile node's current location. Mobile IP introduces an entity referred to as a Home Agent (HA), which anchors the node mobility by intercepting packets addressed to the mobile node and more or less transparently forwarding them to the mobile node's care-of address. The mobile node establishes an address binding between the care-of address and the home address, and sends so-called binding updates to its Home Agent (HA) and the correspondent nodes with which it is communicating.

Reference [1] discloses a Mobile IP version 4 (MIPv4) compliant Home Agent, which allows a mobile station with mobile IP client functionality to access the IPv4 Internet using Mobile IP-based service access.

The Mobile IP version 6 (MIPv6) protocol [2] allows nodes to remain reachable while moving around in the IPv6 Internet.

The Host Identity Protocol (HIP) described in reference [3] addresses mobility in a slightly different way compared to Mobile IP. In the current Internet, nodes or hosts are identified using IP addresses that depend on the topological location of the hosts. The IP address name space is easily overloaded since IP addresses identify both hosts and topological locations. The HIP protocol suggests a way of separating the location and host identity information based on the introduction of a new name space for host identities. Each host will have at least one Host Identity and a corresponding Host Identifier. The host identifier is cryptographic in nature; it is the public key of an asymmetric key-pair. A HIP-based host may change the point of attachment to the Internet. When the connection point is changed, the IP address also changes. This changed location information is sent to the peer nodes. The same address is also sent to a so-called Forwarding Agent (FA) of the host so that the host can be reached also via a more stable point provided by the FA. The HIP mobility defines a re-address parameter that contains the current IP address of the host. When the host changes location and IP address, it generates an update packet with a re-address parameter, signs the packet with the private key matching the used host identity and sends the packet to the peer node and to the FA. The peer node performs an address verification of the IP addresses in the re-address parameter.

Although the above protocols may be suitable for handling node mobility, they do not explicitly address the need for network mobility, where a so-called movable or mobile network, comprising one or more mobile routers and associated nodes, moves within the Internet topology. The formation of a movable or mobile network may involve various levels of complexity. In a simple case, the mobile network includes just a mobile router and an attached node. In more complex scenarios, the mobile network may be a set of subnets interconnected by local routers forming an aggregate able to move as a unit, and interconnected to the backbone through one or more mobile routers. Examples of movable or mobile networks include:

A laptop with cellular and/or WLAN (Wireless Local Area Network) hotspot connections acting as a mobile router for a set of other IP devices (e.g. mobile phones, personal digital assistants, communicators, handheld computers and so forth) of a user, and providing connectivity to the external network as the user moves between different networks.

A vehicle such as a car, bus or train deploying a vehicular network for its equipment and its passenger's laptops and other communication devices, with one or more mobile routers providing connectivity to the external network as the vehicle moves between different networks.

Network mobility generally introduces far more complex mobility scenarios than the node mobility concept. A movable or mobile network, at home or in a visited network, may itself be visited by mobile nodes and/or other movable or mobile networks.

The NEMO (Network Mobility) working group of the Internet Engineering Task Force (IETF) proposes a solution based on the Mobile IP tunneling mechanism, thus providing high interoperability with the mobility aspects of the existing Mobile IP protocols.

The NEMO Basic Support Protocol described in reference [4] enables so-called movable or mobile networks to attach to different points in the Internet. The protocol is an extension of Mobile IPv6 and allows for session continuity for every node in the mobile network as the network moves. It also ensures connectivity and reachability for every node in the mobile network as the network moves. The Mobile Router, which connects the mobile network to the Internet, runs the NEMO Basic Support protocol with its Home Agent. The protocol is designed in such a way that network mobility is transparent to the nodes inside the mobile network. In order to tunnel packets to the Mobile Router, the Home Agent needs to be able to associate the home addresses of the nodes inside the mobile network with the home address of the Mobile Router. To recognize the nodes inside a movable or mobile network, it is sufficient to know the prefix of the IP address owned by the Mobile Router. This information is then typically configured in the Home Agent.

A possible approach towards more advanced Network Mobility is the Prefix Scope Binding Update concept described in reference [5]. It basically suggests that a mobile router advertises its mobility not only with a MIPv6 Binding Update but also with a Prefix Scope Binding Update for binding the movable network prefix with the mobile router's care-of address.

Access control is a critical aspect for any large-scale deployment of network mobility support. Large-scale deployments of network mobility are usually found in commercial applications, for example where Internet Service Providers (ISP) provide fixed and mobile access routers and allow subscribers to attach devices to the access routers for Internet connection. Examples of such applications include, but are not limited to, providing Internet access in vehicles such as trains, ships and aircrafts.

The need for access control exists in all networks that allow unknown devices to connect to the network and identify themselves in order to gain access to services and/or resources provided in the considered network. Access control may for example be required in these networks in order to protect the interests of paying subscribers. If there is no access control, significant portions of the network resources may be used by unauthorized users, thereby affecting the quality of service provided to the legitimate subscribers.

Reference [6] describes a basic AAA (Authentication, Authorization, and Accounting) model for NEMO, as well as various usage scenarios. Regarding client access authentication for nodes in NEMO-based mobile networks, the draft proposes an AAA solution between Visiting Mobile Node and Mobile Router that essentially has the Mobile Router performing/behaving as a Network Access Server. The Visiting Mobile Node will first initiate an access request by sending relevant messages to the Mobile Router it attached to using a "link-local" AAA protocol. The Mobile Router contacts an external AAA server (for example in the Visiting Mobile Node's home network) to perform the actual authentication and authorization by employing one of the "global" AAA protocols. However, this means that a heavyweight protocol such as Radius or Diameter is going to be used over the air, which does not make up for good use of scarce radio resources.

There is a general need for improved network mobility support and more specifically improved access control for movable or mobile networks.

SUMMARY

The present invention overcomes these and other drawbacks of the prior art arrangements.

It is a general object of the invention to improve network mobility support and access control for network-mobility enabled networks, commonly referred to as movable or mobile networks.

In particular, it is desirable to find an access control mechanism that improves the utilization of the radio resources.

It is an object of the invention to provide a method and arrangement for access control for a movable network.

It is a special object to provide a so-called mobility-anchoring agent that supports the improved network access control.

Another special object is to provide a corresponding enforcement point for operation with a mobility anchoring agent.

It is also a special object of the invention to provide an improved method and arrangement for network mobility support.

These and other objects are met by the invention as defined by the accompanying patent claims.

A basic idea according to the invention is to locate access control enforcement points at both the mobile router and the mobility anchoring agent that anchors the network mobility for the mobile router, and exercise access control at the mobility anchoring agent to filter downlink packets to the mobile router and exercise access control at the mobile router to filter uplink packets to the mobility anchoring agent. In this way, unauthorized packets, both uplink and downlink, do not have to cross the air interface before being filtered away, thereby preventing waste of valuable radio resources.

The mobility-anchoring agent may for example be a home agent in the mobile router's home network; a so-called Mobile Router Home Agent (MRHA). Alternatively, the mobility-anchoring agent may be a local forwarding agent (FA) in a visited network.

Preferably, the mobility-anchoring agent runs a NEMO-based (Network Mobility) mobility support protocol with the mobile router. The mobile router is then typically interconnected with the mobility-anchoring agent through a NEMO bi-directional tunnel, and both uplink and downlink packets are filtered before the NEMO bi-directional tunnel. It should however be understood that the invention is generally applicable to any network-mobility enabled network.

The access control enforcement points with their access control modules are typically provisioned with provisioning information, also referred to as configuration information, such as access control filter information from an access control source, which normally form part of an overall AAA infrastructure. The access control source may for example be an AAA client cooperating with one or more AAA servers that provide the underlying authentication and authorization information for the nodes in the movable network.

The provisioning information may be transferred to the access control enforcement points in different ways. In a flat provisioning architecture, for example, the same provisioning information may be transferred to each enforcement point from the same access control source, thereby offering simple implementation. Alternatively, in a hierarchical provisioning architecture, the mobility anchoring agent receives provisioning information from the access control source and provisions its access control module with the part of the provisioning information that is related to the downlink, and subsequently forwards the part of the provisioning information that is related to the uplink to the mobile router for provisioning the mobile router's access control module. The hierarchical architecture has the advantage that provisioning information related to the downlink does not have to be sent over the air interface to the mobile router enforcement point, once again saving valuable radio resources.

Preferably, the AAA client acting as access control source is located in the same network as the mobility anchoring agent, and provisioning information from the AAA client to the mobile router side is transferred at least partly over the bi-directional link (e.g. the NEMO tunnel) between the mobility anchoring agent and the mobile router. In this way, it is no longer necessary to use a heavyweight AAA protocol such as Radius or Diameter over the air interface. Instead, a lightweight protocol such as PANA (Protocol for carrying Authentication for Network Access), PPP (Point-to-Point Protocol) or IEEE 802.1X can be used to carry authentication and authorization information via the bi-directional link.

This aspect of the invention can be separately implemented, generally re-using the bi-directional link between the mobile router and the mobility anchoring agent for transferring provisioning information from an access control source located in the same network as the mobility anchoring agent to the mobile router side.

The invention offers the following main advantages:
Improved network mobility support;
Improved network access control; and
Improved radio resource utilization.

Other advantages offered by the present invention will be appreciated upon reading of the below description of the embodiments of the invention.

BRIEF DESCRIPTION OF THE SEVERAL VIEWS OF THE DRAWINGS

The invention, together with further objects and advantages thereof, will be best understood by reference to the following description taken together with the accompanying drawings, in which.

DETAILED DESCRIPTION

Figure 1:
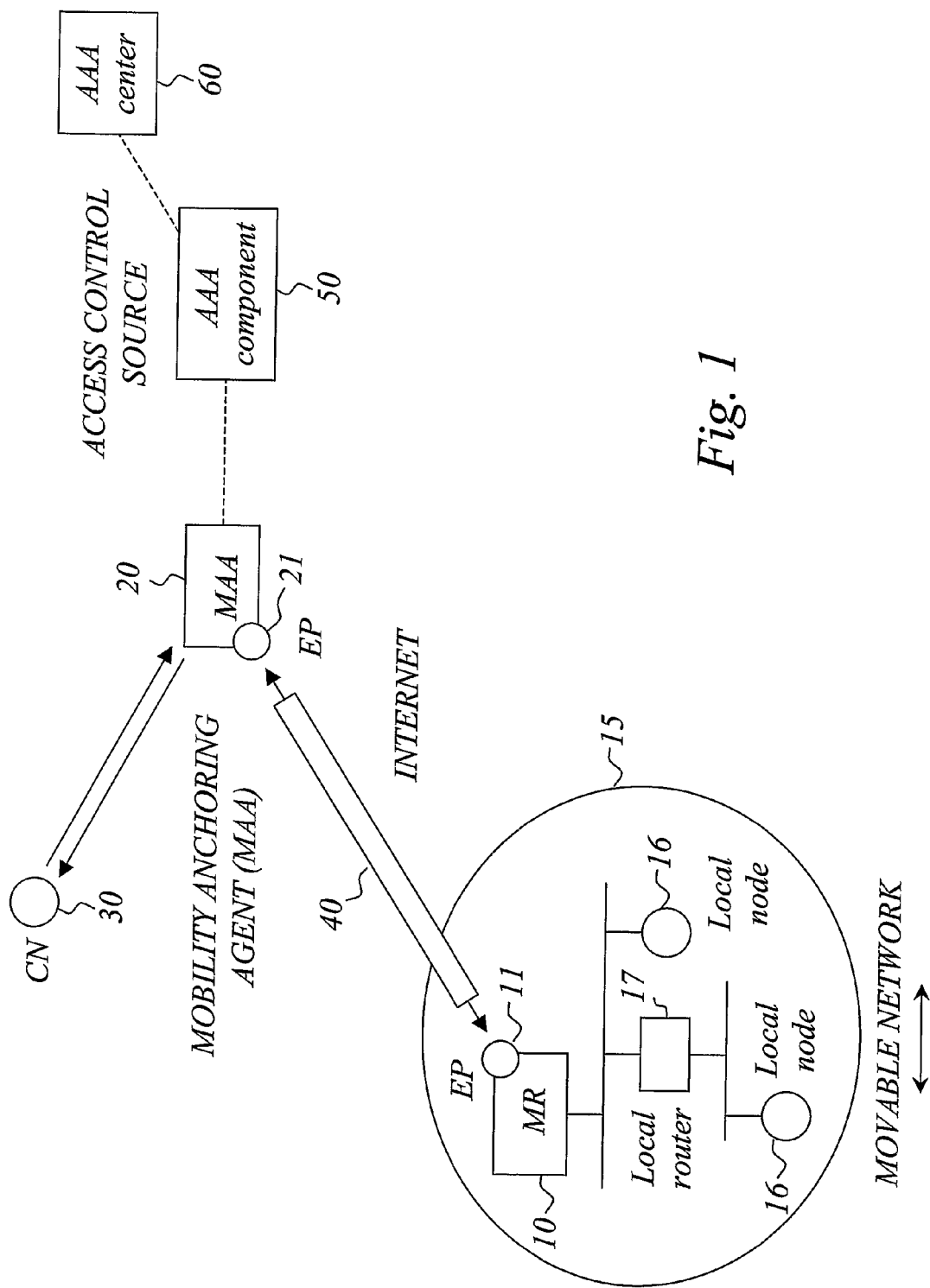
FIG. 1 is a schematic diagram of a basic architecture for network mobility support and access control according to an exemplary embodiment of the invention.

Throughout the drawings, the same reference characters will be used for corresponding or similar elements.

FIG. 1 is a schematic diagram of a basic architecture for network mobility support and access control according to an exemplary embodiment of the invention. The invention is applicable in any context that involves a Mobile Router (MR) 10 that manages a movable or mobile network 15, and a network side counterpart in the form of a Mobility Anchoring Agent (MAA) 20, which anchors the mobility aspects of the movable network 15 and among other things forwards information to/from Correspondent Nodes (CN) 30. As previously described in the background section, the mobile router 10 is typically interconnected with the mobility anchoring agent 20 through a bi-directional link 40, such as a bi-directional NEMO tunnel.

The movable or mobile network may involve various levels of complexity. In a simple case, the mobile network includes just a mobile router and an attached node. In more complex scenarios, the mobile network may be a set of subnets interconnected by local routers, and interconnected to the backbone through one or more mobile routers. In FIG. 1, the movable network is illustrated as having an intermediate level of complexity. The movable network 15 is managed by a single mobile router 10, but includes local nodes 16 as well as a local router 17.

A basic idea of the invention is to locate access control enforcement points (EP) 11, 21 at both the mobile router 10 and the mobility anchoring agent 20, and exercise access control at the mobility anchoring agent 20 to filter downlink packets to the mobile router and exercise access control at the mobile router 10 to filter uplink packets to the mobility anchoring agent. In this way, unauthorized packets, both uplink and downlink, do not have to cross the air interface before being filtered away, thereby preventing waste of valuable radio resources in the mobile Internet.

The mobility anchoring agent 20 may be any mobile router counterpart on the network side responsible for anchoring the mobility aspects of the mobile router 10. For example, the mobility anchoring agent may be a Home Agent (HA) in the mobile router's home network; a so-called Mobile Router Home Agent (MRHA), or a local Forwarding Agent (FA) in a visited network.

The access control enforcement points 11, 21 with their access control modules are typically provisioned with provisioning or configuration information such as access control filter information from an access control source 50, which normally form part of an overall AAA infrastructure. The AAA component acting as access control source 50 normally cooperates with one or more AAA centers 60 that provide the underlying authentication and authorization information for the nodes in the movable network 15.

Figure 2:
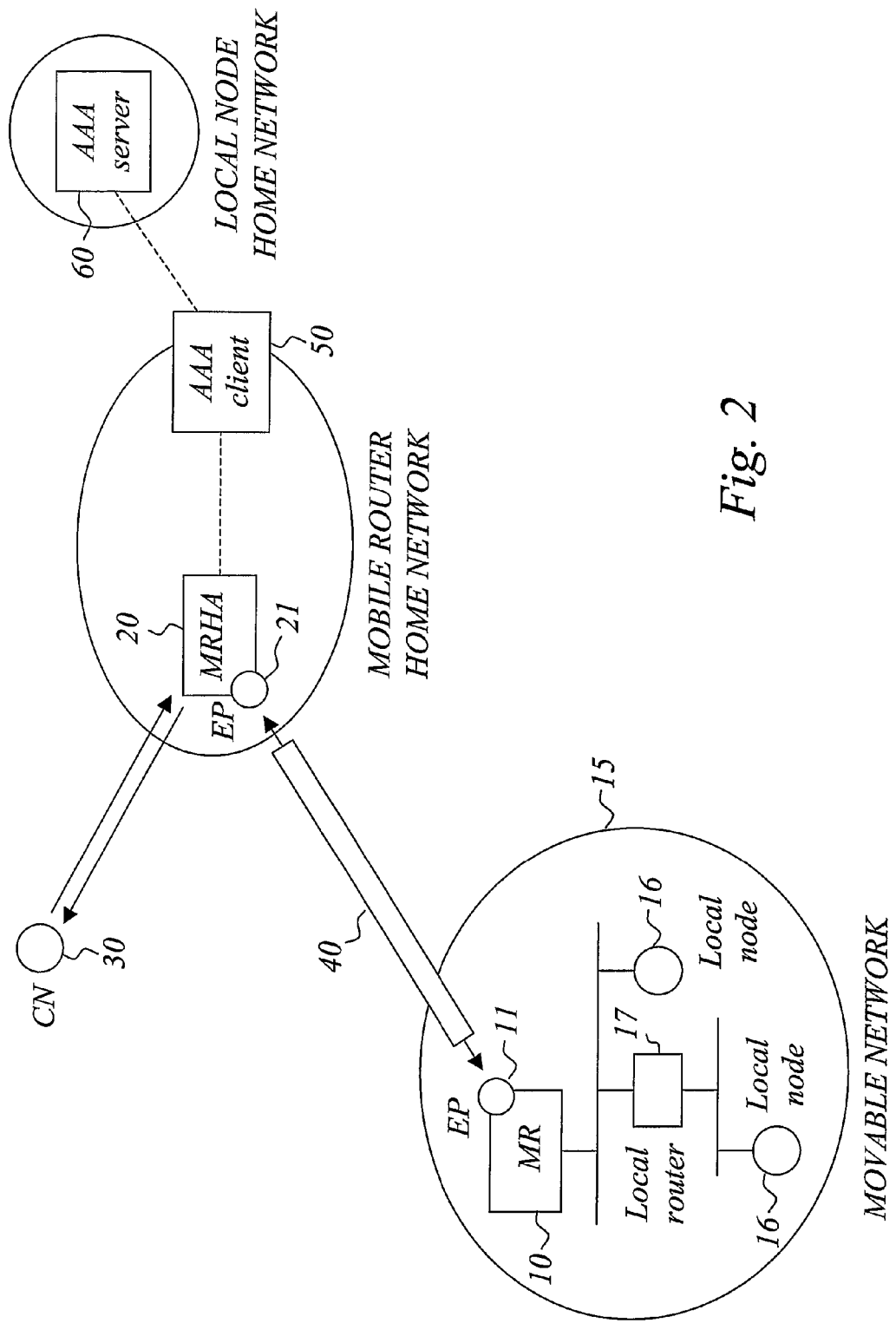
FIG. 2 is a schematic diagram of a network mobility support architecture, for the particular case when the mobility anchoring agent is a home agent of the mobile router, according to an exemplary embodiment of the invention.

FIG. 2 is a schematic diagram of a network mobility support architecture according to a particular embodiment of the invention. In this example, the mobility anchoring agent 20 is a Mobile Router Home Agent (MRHA) with an associated access control enforcement point (EP). In the same way as previously described, the EP 11 at the mobile router 10 monitors and filters uplink packets on the bi-directional link 40 and the EP 21 at the MRHA 20 monitors and filters downlink packets. Here, the access control source is implemented in an AAA client 50 or similar AAA component, which preferably is located in the mobile router's home network. The access control information for a given local node 16 in the movable network 15 is initially provided by an AAA server 60 associated with the local node's home network. Upon successful authentication of the node, this information may be then transferred from the AAA server 60 in the local node's home network to the AAA client 50 in the mobile router's home network over an AAA framework protocol such as Diameter or Radius. Since the AAA client 50 is located in the mobile router's home network, the relevant access control information can then easily be conveyed to the EP 21 at the MRHA 20 within the home network, and can also be conveyed in an efficient manner to the EP 11 at the MR 10 by using the bi-directional link 40. This means that a lightweight protocol such as PANA, PPP or IEEE 802.1X or any combination thereof can be used to carry access control information as well as information for node authentication via the bi-directional link 40.

For comparison, reference [6] assumes that access control functionality is located in the Network Access Server, which is the mobile router, and does not prevent unauthorized downlink packets from crossing the air interface before being filtered away at the mobile router. In reference [6], all the access control information is transferred to and implemented in the NAS.

In the following, the invention will mainly be described with reference to access control of nodes in NEMO-based mobile networks. However, it should be understood that the invention is not limited thereto. In fact, the inventive mechanisms, including filtering and control mechanisms, can be applied to movable or mobile networks in general. Other examples than NEMO-based mobile networks include, e.g. mobile networks based on prefix scope binding updates and even future HIP-based mobile networks.

Figure 3:
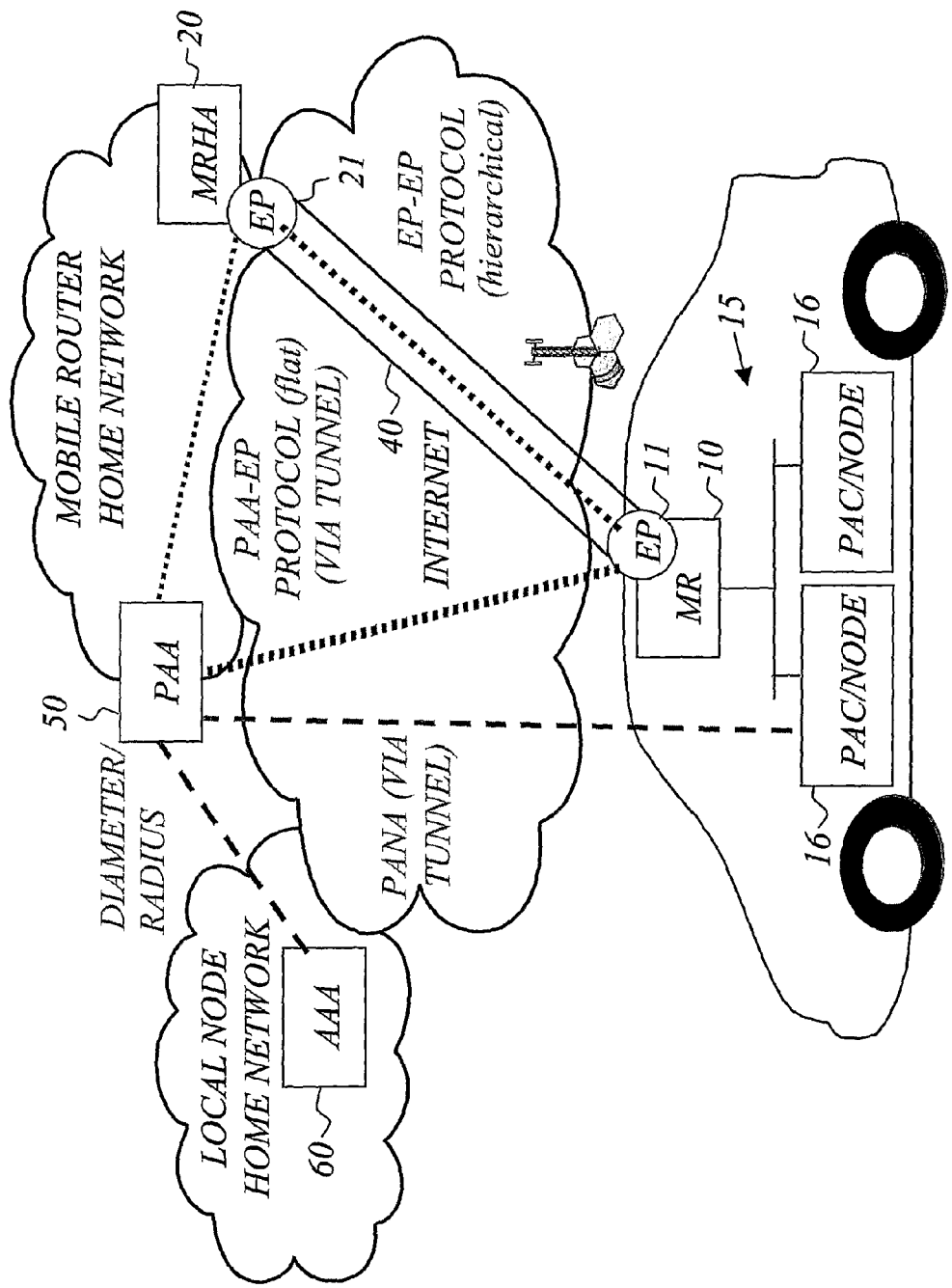
FIG. 3 illustrates an architecture for authentication and/or authorization of nodes in a NEMO-based movable network according to an exemplary embodiment of the invention.

FIG. 3 illustrates an architecture for authentication and authorization of nodes in a NEMO-based movable network according to an exemplary embodiment of the invention. Access control enforcement points (EPs) 11, 21 are located at both the Mobile Router (MR) 10 and the Mobile Router Home Agent (MRHA) 20. As previously discussed, there is a conceivable benefit in locating the EPs both at the mobile router and the mobile router home agent. The access control module in the EP 11 located at the mobile router, called EP_MR for ease of description, monitors the uplink packets before the NEMO bi-directional tunnel 40, while the access control module in the EP 21 located at the mobile router home agent, called EP_MRHA for ease of description, monitors the downlink packets before the NEMO bi-directional tunnel 40. In this example, the AAA client 50 is preferably a PANA Authentication Agent (PAA), implying the use of PANA (Protocol for carrying Authentication for Network Access) [7] for access authentication and/or authorization of client nodes in the NEMO-based mobile network 15.

Preferably, the filtering mechanism in the access control modules involves checking the IP/transport layer headers of IP packets that traverse the access control points to and from node(s) in the mobile network. The access control usually employs a set of packet-filtering rules to decide whether to permit or deny packets. The filtering rules may be based on packet header information that is made available to the IP forwarding process. The filtering may for example be associated with basic network access control and/or related to service access control. For example, the filters may be "activated" or provisioned in the EPs after successful authentication and authorization of the node(s) in the mobile network. This process of activation involves provisioning the filters with access control information, e.g. using SNMP (Simple Network Management Protocol) or any other suitable protocol for transfer of the information. The provisioning of the filters is often regarded as involving transfer of provisioning information as well as configuration of the filters with this information. The provisioning information may be transferred from the access control source to the access control enforcement points in different ways, e.g. by means of a flat (direct) provisioning structure or a hierarchical provisioning structure.

Figure 4:
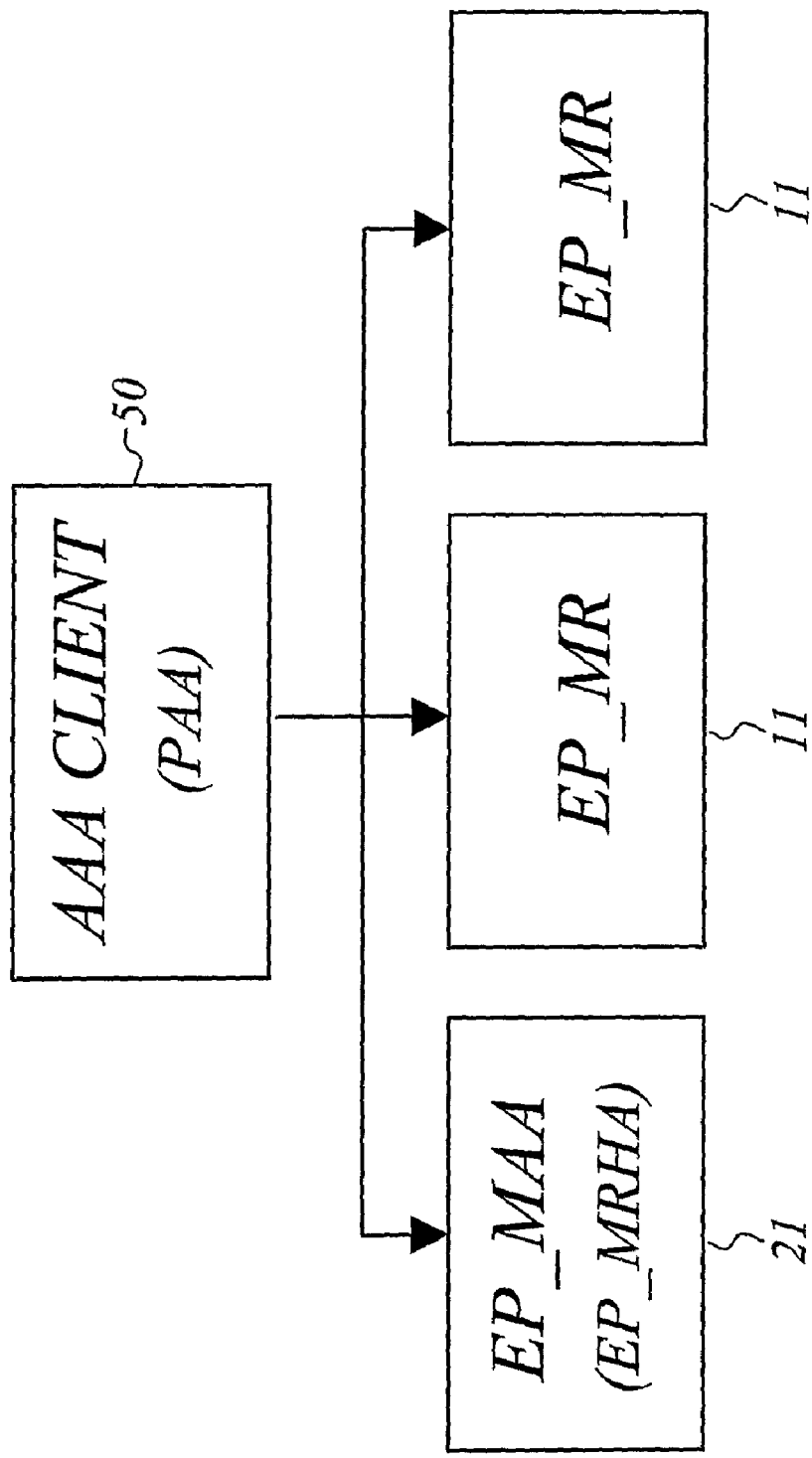
FIG. 4 illustrates an exemplary flat provisioning structure according to an embodiment of the invention.

FIG. 4 illustrates an exemplary flat provisioning structure according to an embodiment of the invention. In a flat structure, the AAA client 50 acting as access control source transfers the same provisioning information to the EP located at the mobility anchoring agent, called EP_MAA 21 for ease of description, and the EP located at each mobile router, called EP_MR 11.

Returning to FIG. 3, this means that with a flat provisioning structure EP_MRHA 21 and EP_MR 11 receive the same provisioning information from the same access control source (PAA) 50.

Figure 5:
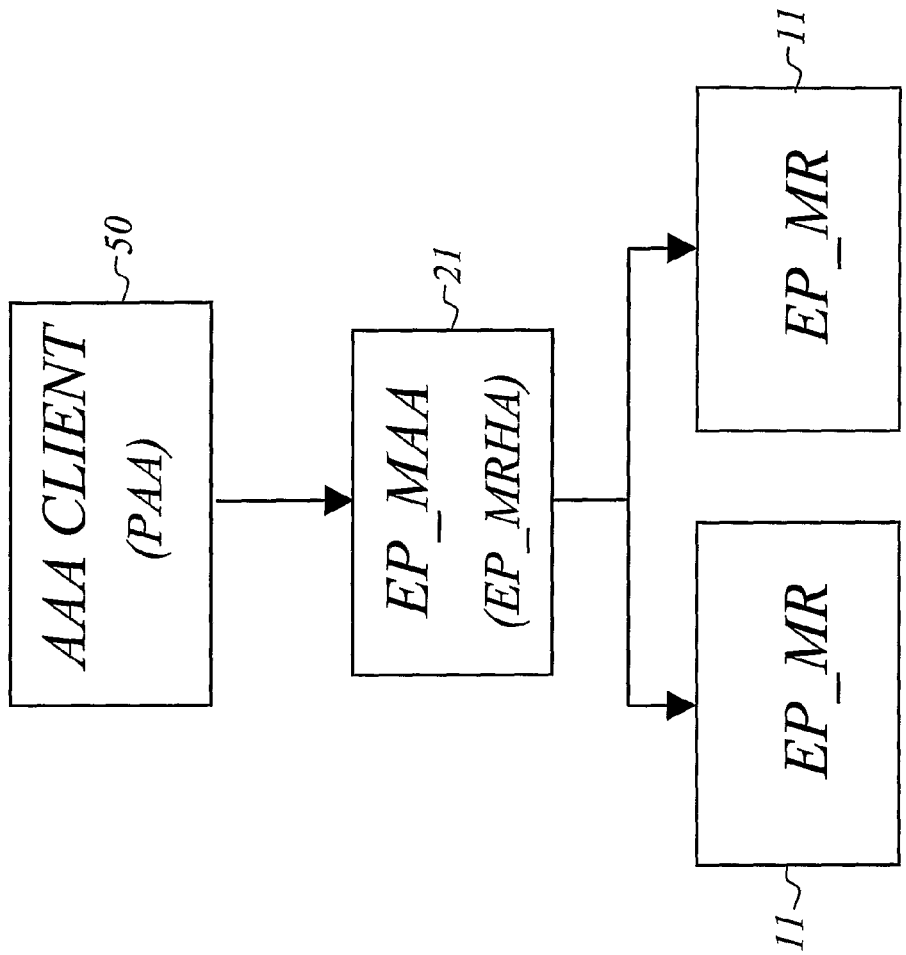
FIG. 5 illustrates an exemplary hierarchical provisioning structure according to an embodiment of the invention.

FIG. 5 illustrates an exemplary hierarchical provisioning structure according to an embodiment of the invention. In a hierarchical structure, the EP located at the mobility anchoring agent, called EP_MAA 21, receives provisioning information from the access control source 50 and preferably provisions (or configures) its access control module with the part of the provisioning information that is related to the downlink, and subsequently forwards the part of the provisioning information that is related to the uplink to the EP located at the mobile router, called EP_MR 11, for provisioning the corresponding access control module. Apparently, there can be a 1-to-n relationship between EP_MAA and EP_MR.

Returning to FIG. 3, this means that with a hierarchical provisioning structure the EP_MRHA 21 receives the provisioning information from the access control source (PAA) 50 and thereafter the EP_MRHA 21 forwards to the EP_MR(s) 11 under its control only the pertinent information related to the uplink direction, i.e. an EP-EP interface.

In the exemplary embodiment of FIG. 3, PANA, PAA-EP, and EP-EP protocols all preferably traverse inside the NEMO bi-directional tunnel 40.

The advantage of the flat provisioning concept is the simplicity of implementation; this concept does not require any EP-EP interface.

The advantage of the hierarchical provisioning concept is that extraneous provisioning information such as data pertaining to downlink filtering need not be sent over the air interface towards the EP_MR, and also, the EP_MR may not need to collect accounting information which can be collected at the EP_MAA (EP_MRHA) anyhow. This prevents waste of radio resources especially for cases where there is frequent movement of nodes in and out of the mobile network.

The provisioning information normally includes the resulting authorization information and may among other things involve the filters (i.e. the access control lists) and restrictions to be used by the EPs, as well as information on the accounting and QoS markings that have to be carried out by the EPs.

Returning once again to FIG. 3, the following exemplary configuration may be used for the case when PANA is used for access authentication and/or authorization of client nodes in NEMO-based Mobile Networks:

PANA Client(s) (PAC(s)) is (are) located at the node(s) 16.

PAA (PANA Authentication Agent) 50 is located at the network where the MRHA 20 resides, and is the access control list source that provisions the EPs 11, 21 as a result of client node access authentication(s).

Locating the PAA 50 at the network where the MRHA 20 resides prevents a heavyweight AAA protocol such as Radius or Diameter from being used over the air interface.

Beyond the PAA 50 towards and within the AAA infrastructure, a suitable AAA carrier protocol such as Diameter or Radius may be used to carry the authentication and authorization information to and from the AAA server 60 associated with the home network of a given node. It should though be understood that different nodes 16 in the movable network 15 may belong to different home networks, and therefore it may be the case that more than one AAA server is involved in the provisioning of authentication and authorization information for the network nodes 16.

The PANA PAA-EP interface protocol [8] supports the optional requirement that the protocol between PAA 50 and EP(s) 11, 21 should be lightweight to accommodate possible air interface traversals. Incidentally, reference [8] recommends the use of SNMP (Simple Network Management Protocol) for the PAA-EP interface, which satisfies the lightweight requirement.

Figure 6:
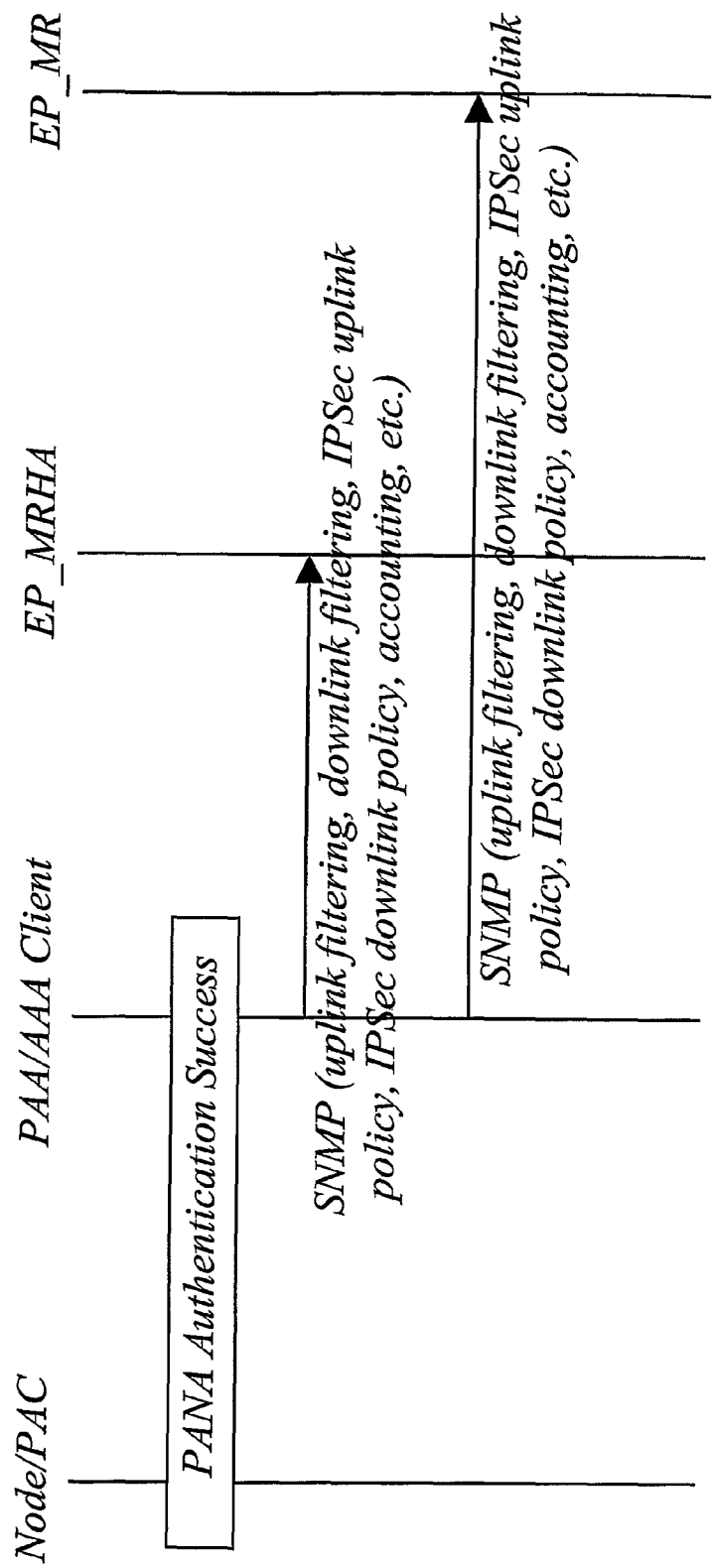
FIG. 6 illustrates an example of the provisioning signaling flow with a flat provisioning structure.

FIG. 6 illustrates an example of the provisioning signaling flow with a flat provisioning structure. After successful PANA authentication of a given node/PAC, SNMP is preferably employed to convey information on uplink filtering, downlink filtering, IPSec uplink policy, IPSec downlink policy, accounting, and so forth over the PAA-EP interface(s) to the EP_MRHA and EP_MR.

Figure 7:
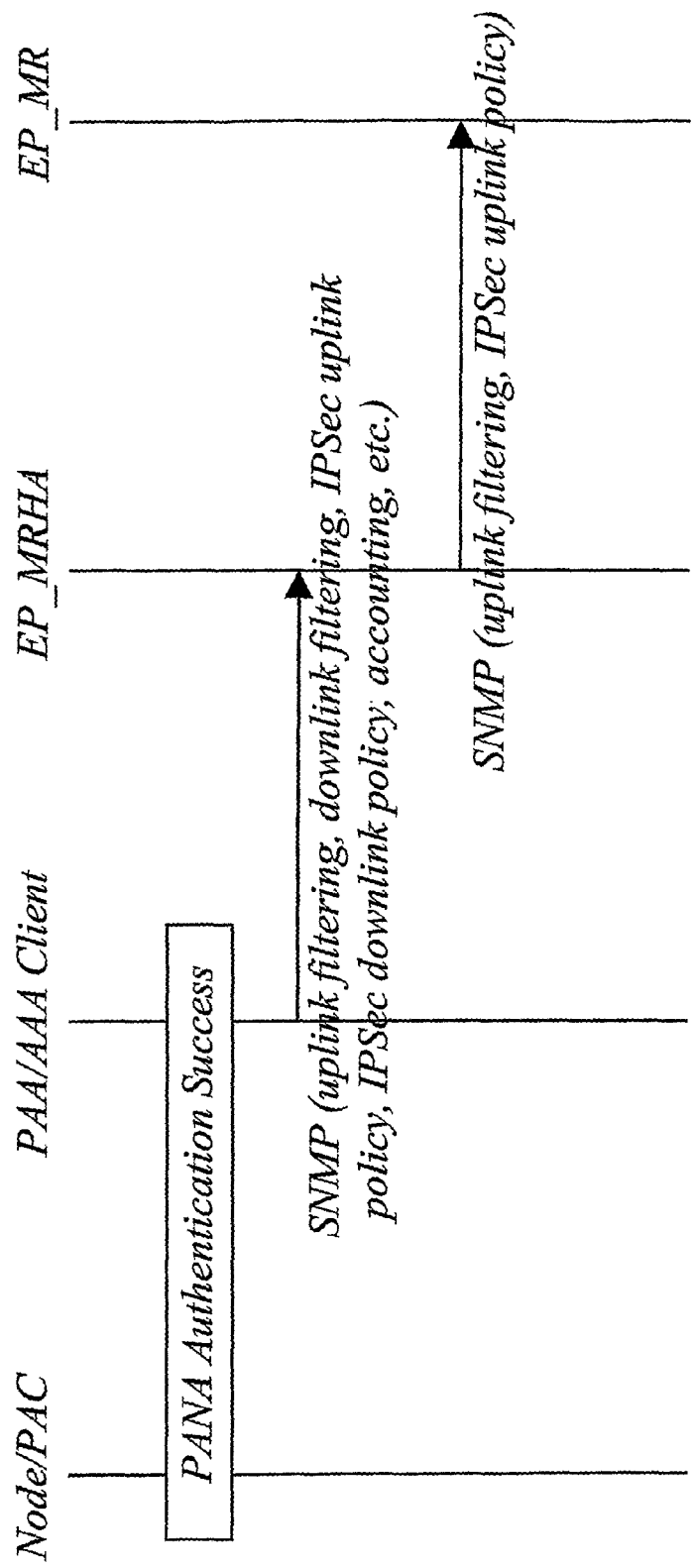
FIG. 7 illustrates an example of the provisioning signaling flow with a hierarchical structure.

FIG. 7 illustrates an example of the provisioning signaling flow with a hierarchical structure. The EP_MRHA-EP_MR (EP-EP) interface protocol for the hierarchical structure is defined to reuse the PANA PAA-EP interface protocol. In effect, from the perspective of the EP_MR, the EP_MRHA is the access control list source that provisions the EPs as a result of client node access authentication. This simplifies the standardization/maintenance needed for the EP_MRHA-EP_MR interface protocol.

For the case where SNMP is used for the PAA-EP interface, the SNMP MIBs (Management Information Bases) are preferably separated into convenient modules for uplink filtering, downlink filtering, IPSec uplink policy, IPSec downlink policy, information on accounting, and so forth, so as to facilitate simple implementation at the EP_MRHA. This means that the necessary MIB modules for uplink filtering and IPSec uplink policy can be extracted in a simple and straightforward manner, and subsequently forwarded to the EP_MR, as indicated in the signaling flow of FIG. 7.

In a special embodiment of the invention, the MRHA may be selected/authorized as the local Home Agent for a node in the movable network. This is for the case where the node is a Mobile IP node, and a local Home Agent is allowed to be selected by the mobile node's home network operator and the network operator of the MRHA, e.g. via some inter-operator agreement. Selecting the MRHA as the mobile node's local Home Agent where possible provides the possibility for route optimization as packets bound for the mobile node will have to traverse only one Home Agent instead of two.

The embodiments described above are merely given as examples, and it should be understood that the present invention is not limited thereto. Further modifications, changes and improvements which retain the basic underlying principles disclosed herein are within the scope of the invention.

REFERENCES

[1] Cisco Mobile Wireless Home Agent, Data Sheet, 2003.
[2] Mobility Support in IPv6, D. Johnson, C. Perkins, J. Arkko, Jun. 30, 2003, <draft-ietf-mobileip-ipv6-24.txt>.
[3] Host Identity Protocol Architecture, R. Moskowitz, P. Nikander, September 2003, <draft-moskowitz-hip-arch-05>.
[4] Network Mobility (NEMO) Basic Support Protocol, Vijay Devarapalli, Ryuji Wakikawa, Alexandru Petrescu, Pascal Thubert, December 2003, <draft-ietf-nemo-basic-support-02.txt>.
[5] Mobile Networks Support in Mobile IPv6 (Prefix Scope Binding Updates), Ernst et al., March 2002, <draft-ernst-mobileip-v6-network-03.txt>.
[6] Usage Scenario and Requirements for AAA in Network Mobility Support, C. W. Ng, T. Tanaka, October 2002, <draft-ng-nemo-aaa-use-00.txt>.
[7] Protocol for Carrying Authentication for Network Access (PANA), D. Forsberg, Y. Ohba, B. Patil, H. Tschofenig, A. Yegin, Oct. 24, 2003, <draft-ietf-pana-pana-02.txt>.
[8] PANA PAA-EP Protocol Considerations, Yacine El Mghazli, October 2003, <draft-yacine-pana-paa2ep-prot-eval-00.txt>.

The invention claimed is:

1. A method of access control for a movable network managed by a mobile router, wherein said mobile router is interconnected through a bi-directional radio link with a mobility anchoring agent that anchors the network mobility for the mobile router, said method comprising the steps of:
receiving at the mobile router, access control filter information originating from an access control source, wherein the access control filter information is received at least in part over the bi-directional radio link via the mobility anchoring agent;
configuring a first access control module at the mobile router with the access control filter information;
filtering uplink packets by the first access control module according to the access control filter information to eliminate unauthorized uplink packets; and
transmitting the filtered uplink packets from the mobile router to the mobility anchoring agent over the bi-directional radio link.

2. The method of claim 1, further comprising the steps of:
receiving at the mobility anchoring agent, the access control filter information originating from the access control source;
configuring a second access control module at the mobility anchoring agent with the access control filter information;
filtering downlink packets by the second access control module according to the access control filter information to eliminate unauthorized downlink packets; and
transmitting the filtered downlink packets from the mobility anchoring agent to the mobile router over the bi-directional radio link.

3. The method of claim 2, wherein the access control source sends the access control filter information through a flat provisioning architecture in which the same access control filter information is sent to the mobility anchoring agent for filtering downlink packets and to the mobile router for filtering uplink packets.

4. The method of claim 2, wherein the access control source sends the access control filter information through a hierarchical provisioning architecture in which the mobility anchoring agent receives the access control filter information and configures the second access control module with a first portion of the access control filter information related to downlink packets, and subsequently forwards to the mobile router, a second portion of the access control filter information related to uplink packets.

5. The method of claim 2, wherein the access control filter information includes packet-filtering rules for controlling access to particular services, and the filtering steps are performed after nodes in the movable network are authenticated and authorized access to the network.

6. The method of claim 2, wherein said mobility anchoring agent is a home agent in a home network of said mobile router.

7. The method of claim 2, wherein said mobility anchoring agent is a local forwarding agent in a visited network.

8. The method of claim 2, wherein said mobility anchoring agent runs a NEMO-based (Network Mobility) mobility support protocol with said mobile router.

9. The method of claim 8, wherein said mobile router is interconnected with said mobility anchoring agent through a NEMO bi-directional tunnel, and the mobility anchoring agent filters downlink packets before said NEMO bi-directional tunnel, and the mobile router filters uplink packets before said NEMO bi-directional tunnel.

10. The method of claim 2, wherein said step of filtering downlink packets at the mobility anchoring agent includes checking headers of downlink IP packets that traverse an access control point in said mobility anchoring agent, and said step of filtering uplink packets at said mobile router includes checking headers of uplink IP packets that traverse an access control point in said mobile router.

11. The method of claim 2, wherein said access control source is implemented in an Authentication, Authorization and Accounting (AAA) client, and provisioning information related to a node in said movable network is transferred from an AAA server associated with the home network of said node to said AAA client and the access control source.

12. An arrangement for access control for a movable network, the arrangement comprising:
a mobile router for managing the movable network; and
a mobility anchoring agent interconnected to the mobile router through a bi-directional radio link, the mobility anchoring agent anchoring the network mobility for the mobile router;
wherein the mobile router includes:
means for receiving access control filter information originating from an access control source, wherein the access control filter information is received at least in part over the bi-directional radio link via the mobility anchoring agent;
a first access control module for filtering uplink packets according to the access control filter information to eliminate unauthorized uplink packets; and
means for transmitting the filtered uplink packets from the mobile router to the mobility anchoring agent over the bi-directional radio link.

13. The arrangement of claim 12, wherein the mobility anchoring agent includes:
means for receiving the access control filter information from the access control source;
a second access control module for filtering downlink packets according to the access control filter information to eliminate unauthorized downlink packets; and
means for transmitting the filtered downlink packets from the mobility anchoring agent to the mobile router over the bi-directional radio link.

14. The arrangement of claim 13, wherein the mobility anchoring agent and the access control source are located in the same network.

15. The arrangement of claim 13, wherein said mobile router and said mobility anchoring agent are configured to run a NEMO-based (Network Mobility) mobility support protocol.

16. The arrangement of claim 13, wherein said mobile router is interconnected with said mobility anchoring agent through a NEMO bi-directional tunnel, and said filtering means at said mobility anchoring agent filters the downlink packets before said NEMO bi-directional tunnel, and said filtering means at said mobile router filters the uplink packets before said NEMO bi-directional tunnel.

17. A mobility anchoring agent for anchoring network mobility for a mobile router that manages a movable network, the mobility anchoring agent comprising:
means for interconnecting with the mobile router through a bi-directional radio link;
means for receiving access control filter information from an access control source;
an access control module for filtering downlink packets according to the access control filter information to eliminate unauthorized downlink packets; and
means for transmitting the filtered downlink packets from the mobility anchoring agent to the mobile router over the bi-directional radio link.

18. The mobility anchoring agent of claim 17, wherein the means for receiving access control filter information receives the information through a hierarchical provisioning architecture, and the mobility anchoring agent further comprises:
means for configuring the access control module with a first portion of the access control filter information related to downlink packets; and
means for subsequently forwarding to the mobile router, a second portion of the access control filter information related to uplink packets.

19. The mobility anchoring agent of claim 17, wherein said mobility anchoring agent is configured to run a NEMO-based (Network Mobility) mobility support protocol with said mobile router.

20. The mobility anchoring agent of claim 19, wherein the means for interconnecting with said mobile router includes a NEMO bi-directional tunnel, and said means for monitoring and filtering filters the downlink packets before said NEMO bi-directional tunnel.

21. The mobility anchoring agent of claim 17, wherein said means for monitoring and filtering checks headers of packets that traverse an access control point in said mobility anchoring agent.

* * * * *